United States Patent
Huang et al.

(10) Patent No.: US 9,763,266 B2
(45) Date of Patent: Sep. 12, 2017

(54) SYSTEMS AND METHODS FOR SCHEDULING WIRELESS COMMUNICATION

(71) Applicant: Intel IP Corporation, Santa Clara, CA (US)

(72) Inventors: Po-Kai Huang, Santa Clara, CA (US); Emily H. Qi, Camas, WA (US)

(73) Assignee: Intel IP Corporation, Santa Clara, CA (US)

( * ) Notice: Subject to any disclaimer, the term of this patent is extended or adjusted under 35 U.S.C. 154(b) by 113 days.

(21) Appl. No.: 14/751,537

(22) Filed: Jun. 26, 2015

(65) Prior Publication Data

US 2016/0270069 A1 Sep. 15, 2016

Related U.S. Application Data

(60) Provisional application No. 62/131,909, filed on Mar. 12, 2015.

(51) Int. Cl.
*H04W 72/12* (2009.01)
*H04W 74/00* (2009.01)

(52) U.S. Cl.
CPC ...... *H04W 74/006* (2013.01); *H04W 72/1289* (2013.01)

(58) Field of Classification Search
None
See application file for complete search history.

(56) References Cited

U.S. PATENT DOCUMENTS

| 2010/0273419 A1* | 10/2010 | Rajagopal | H04W 72/0426 455/41.2 |
| 2011/0141895 A1* | 6/2011 | Zhang | H04L 12/66 370/235 |
| 2011/0211564 A1 | 9/2011 | Yoneyama et al. | |
| 2013/0132500 A1 | 5/2013 | Vandwalle et al. | |
| 2013/0152143 A1* | 6/2013 | Carney | H04J 3/00 725/91 |
| 2014/0153444 A1 | 6/2014 | Zhou et al. | |
| 2015/0163828 A1* | 6/2015 | Vandwalle | H04W 28/044 370/330 |

FOREIGN PATENT DOCUMENTS

| WO | 2014068366 | 5/2014 |
| WO | 2014074071 | 5/2014 |

OTHER PUBLICATIONS

International Search Report and Written Opinion for International Application No. PCT/US2016/017664 mailed May 25, 2016.

* cited by examiner

*Primary Examiner* — Chi H Pham
*Assistant Examiner* — Shick Hom
(74) *Attorney, Agent, or Firm* — Eversheds Sutherland (US) LLP

(57) ABSTRACT

Provided are systems and methods for a network station identifying a communication schedule announced by a first wireless network station, determining that the first wireless network station has a right to generate an adjusted communication schedule, and causing transmission of an availability window schedule to the first wireless network station. The availability window schedule indicates one or more time slots during which communication with the wireless network station is inhibited.

25 Claims, 5 Drawing Sheets

| | Operating Class / Channel Number | Availability Interval Duration | Availability Intervals Bitmap | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | | | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| Further Availability Map Attribute | Channel 6 | 16 TUs | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | Channel 149 | 16 TUs | 0 | 0 | 0 | 0 | 0 | 0 | 0 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 |
| | Channel x | 16 TUs | 0 | 0 | 0 | 0 | 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 | 0 | 0 | 0 | 0 |
| | Channel y | 16 TUs | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 0 | 0 | 0 | 0 |
| WLAN Infrastructure Attribute | - | 32 TUs | 0 | 0 | 0 | 0 | 0 | 0 | 0 | 0 | 0 | 0 | 0 | 0 | 0 | 0 | 0 | 1 | 1 | 1 | 1 | 1 | 0 | 0 | 0 | 0 | 0 | 0 | 0 | 0 | 0 | 0 | 0 | 0 |
| P2P Operation Attribute | - | 32 TUs | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 0 | 0 | 0 |
| Further NAN Service Discovery Attribute | - | 64 TUs | 1 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 1 | 0 | 0 | 0 | 0 | 0 | 0 | 0 |

FIG. 2

| Bit(s) | Information | Notes |
|---|---|---|
| 0-1 | Availability Interval Duration | Indicates the availability interval duration associated with the Availability Intervals Bitmap field. The value is set as follows: 0: 16 TU; 1: 32 TU; 2: 64 TU; 3: reserved |
| 2 | Indication of FAW or NAW | If bit is set to 0, then the table is FAW. If the bit is set to 1, then the table is NAW. |
| 3 | Indication of forwarding | If bit is set to 1, then it is forwarded NAW/FAW. |
| 4-7 | Reserved | — |

FIG. 3

SYSTEMS AND METHODS FOR SCHEDULING WIRELESS COMMUNICATION

RELATED APPLICATIONS

This patent application claims the benefit of U.S. Provisional Patent Application No. 62/131,909, filed Mar. 12, 2015 and titled "SYSTEMS AND METHODS FOR SCHEDULING WIRELESS COMMUNICATION", which is hereby incorporated by reference in its entirety.

TECHNICAL FIELD

This application relates to wireless networks and, more particularly, to scheduling wireless communication.

BACKGROUND

Wireless communication networks enable various forms of communication without the use of wires and cables. Wireless networks include, for example, cellular phone networks, wireless local area networks (WLANs), and the like. A WLAN links two or more devices using some form of a wireless distribution method (e.g., a spread-spectrum or an orthogonal frequency-division multiplexing (OFDM) radio). A WLAN typically includes an access point (AP) that connects other communication devices, or stations (STAs), to other network resources, such as the Internet. In some instances, STAs can communicate with one another via the AP, or communicate with one another directly. The Wi-Fi Aware™ specification provides a platform for STAs to discover and communicate with one another when they are in proximity (range) of one another.

BRIEF DESCRIPTION OF THE DRAWINGS

FIG. 2 is a chart that illustrates a further availability window (FAW) time schedule in accordance with one or more example embodiments of the disclosure.

FIG. 3 is a table that illustrates an example entry control definition in accordance with one or more example embodiments of the disclosure.

DETAILED DESCRIPTION

Figure 1:
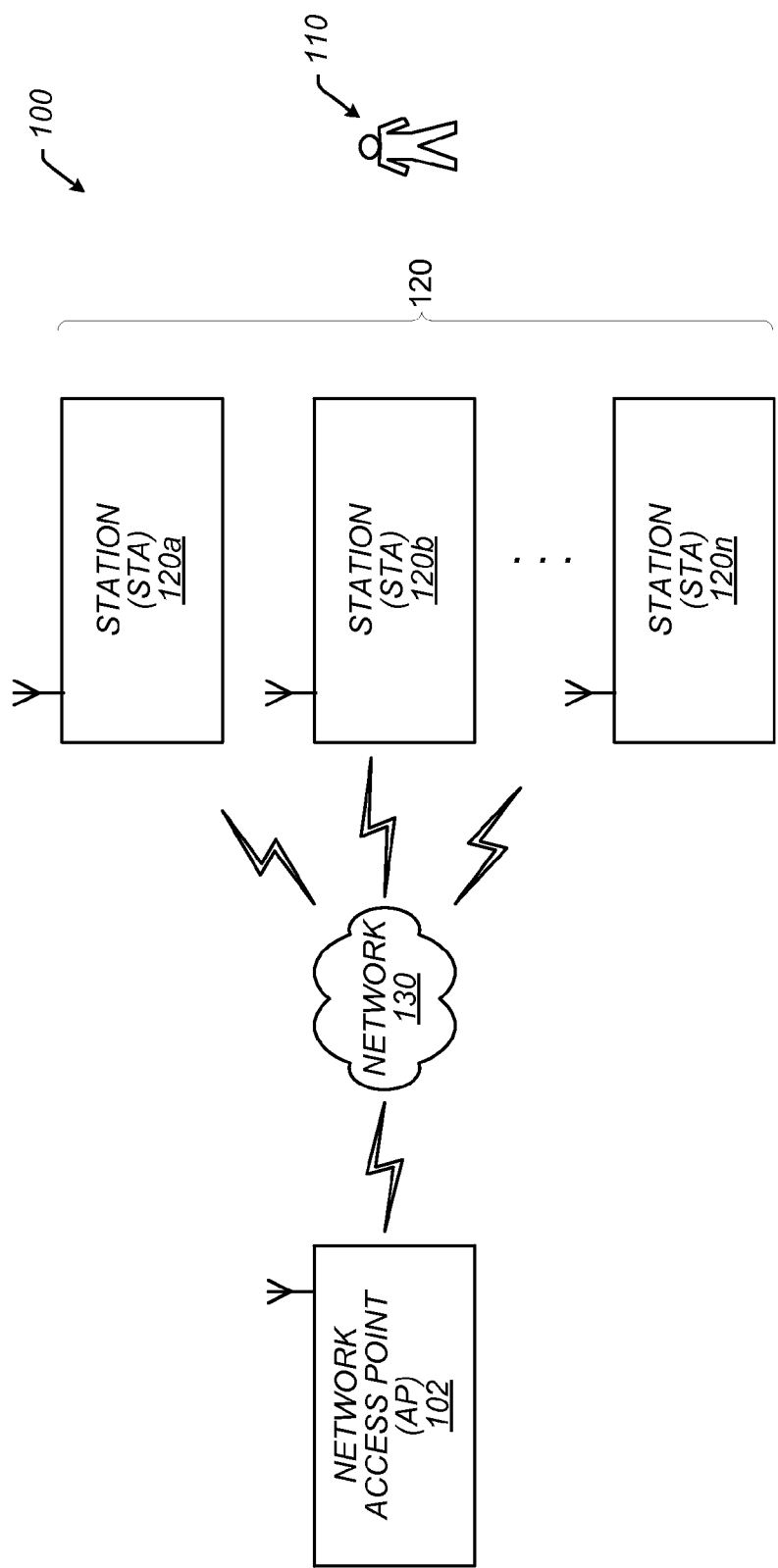
FIG. 1 is a block diagram illustrating an example network environment in accordance with one or more example embodiments of the disclosure.

The present embodiments will now be described more fully hereinafter with reference to the accompanying drawings in which exemplary embodiments are shown. Embodiments may, however, be provided in many different forms and should not be construed as limited to the illustrated embodiments set forth herein. Rather, these exemplary embodiments are provided so that this disclosure will be thorough and complete, and will fully convey the scope of the disclosure to those skilled in the art.

In some embodiments, systems and methods are provided for scheduling wireless communication. In some embodiments, the scheduling of wireless data transmissions includes scheduling transmissions between wireless network stations (STAs) in a one-to-one, many-to-many, or any-to-any framework. In some embodiments, STAs announce or otherwise exchange communication schedules, including further availability windows (FAWs), and/or non-availability windows (NAWs) (or all-availability windows (AAWs)). An NAW announced or otherwise provided by an STA may indicate time slots during which communication with the STA is not available or is otherwise inhibited. An AAW announced or otherwise provided by an STA may indicate all time slots during which communication by the STA is available or otherwise not inhibited. One of the STAs may generate an adjusted communication schedule that merges the communication schedules and the NAWs (or AAWs) provided by the other STAs. For example, if a communication schedule indicates that a first channel is available for communication between STAs during first, second and third time slots, but an NAW announced by an STA indicates that communication with the STA on the first channel is inhibited during the third time slot, then an STA may generate an adjusted communication schedule that indicates that the first channel is available for communication between STAs during the first and second time slots, but not the during the third time slot. The STA may announce the adjusted communication schedule to one or more other STAs, and the STAs may communicate with one another in accordance with the adjusted communication schedule. For example, the STAs may communicate with one another on the first channel during the first and second time slots, but may not communicate with one another on the first channel during the third time slot.

The Wi-Fi Aware™ specification provides a platform for devices (e.g., STAs) to discover and communicate with one another when they are in proximity (range) of one another. Wi-Fi Aware™ can be used to form a Wi-Fi Aware cluster of devices in proximity to one another, and devices in the same Wi-Fi Aware cluster can follow the same time schedule, called a discovery window, to facilitate cluster formation and to achieve a low power discovery operation. After the discovery process, devices can then have peer-to-peer data transmission, for example, without involving other network infrastructure, such as an access point (AP). Thus Wi-Fi Aware™ can be used to facilitate one-to-one, many-to-many, or any-to-any data transmission without infrastructure support. That is, for example, devices, such as STAs, may be able to communicate directly with one another, without the need to route their communications through an intermediary, such as an AP. To facilitate these types of peer-to-peer communications, a device can announce a communication schedule, that specifies the time and channels that other devices can meet with this device.

Unfortunately, announcing the schedules by each individual station can cause issues. As an example of a first issue, if a device wants to transmit to/receive from multiple stations, then it may need to follow multiple schedules, which will increase the power consumption. That is, for example, a device may need to continually wake up to communicate during different time slots to communicate with different devices. As a further example of an issue, each device may have specific constraints to transmit or receive in a particular time or channels. For example, one device may use Bluetooth on a certain channel, but cannot transmit or receive Wi-Fi signals on that channel. Hence, a schedule announced by device A may not be suitable for use by other devices that want to communicate with device A.

In some embodiments, a signaling referred to herein as a no availability window (NAW), can be used by a device to announce its resource constraints. If a device announces a communication schedule, other devices can send an NAW as feedback to the device, and, then, the device can generate a new communication schedule that takes into account the feedback (e.g., the device can adjust or otherwise modify the communication schedule based on the NAWs to generate an adjusted communication schedule), and the device can announce the new schedule to the other devices.

FIG. 1 is a block diagram illustrating an example wireless network environment ("wireless network") 100 in accordance with one or more example embodiments of the disclosure. Wireless network 100 can include one or more wireless network stations (STAs) 120 (also referred to as "stations" or "user devices") (e.g., STAs 120a-120n) and one or more network access points (AP) 102, which may communicate in accordance with the IEEE 802.11 communication standards, including IEEE 802.11ax. The stations 120 may be mobile devices that are non-stationary and do not have fixed locations. The one or more APs 102 may be stationary and have fixed locations.

Figure 6:
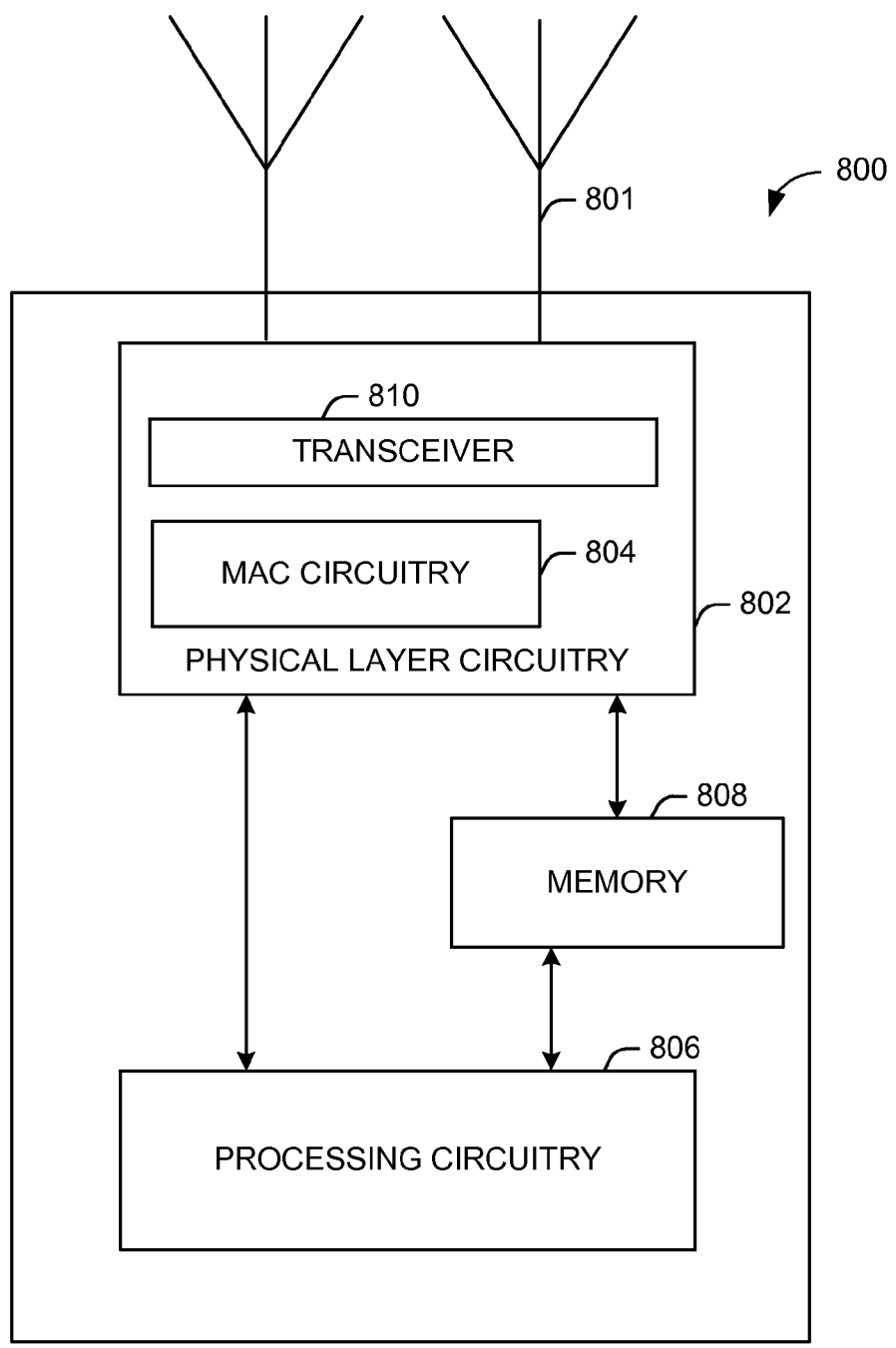
FIG. 6 is a functional diagram illustrating an example communication station in accordance with one or more example embodiments of the disclosure.
Figure 7:
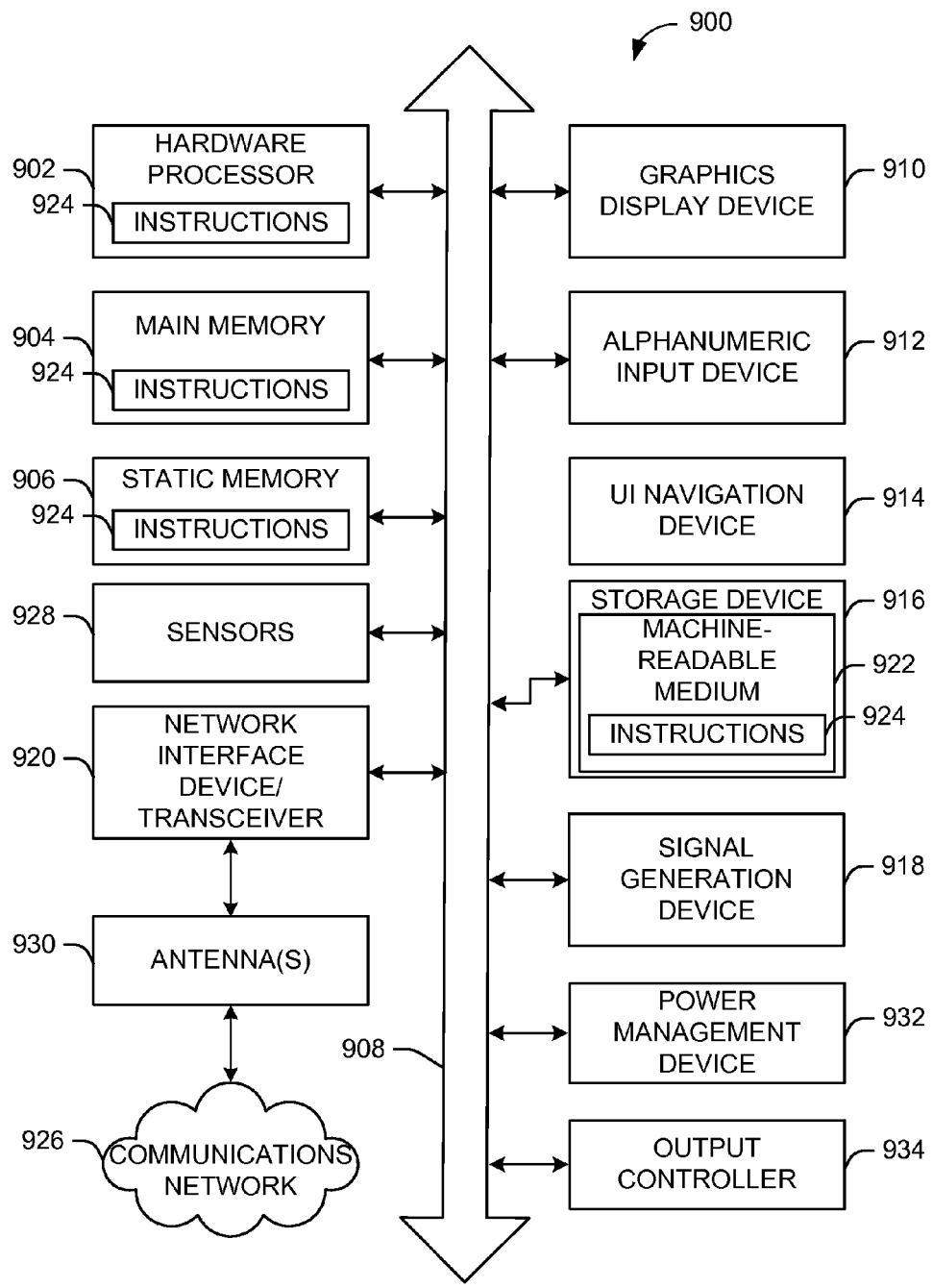
FIG. 7 is a block diagram that illustrates an example machine in accordance with one or more example embodiments of the disclosure.

In some embodiments, the stations 120 and the AP 102 can include one or more computer systems similar to that of the functional diagram of FIG. 6 and/or the example machine/system of FIG. 7.

In accordance with some IEEE 802.11ax (High-Efficiency WLAN (HEW)) embodiments, an access point may operate as a master station which may be arranged to contend for a wireless medium (e.g., during a contention period) to receive exclusive control of the medium for an HEW control period. The master station may transmit an HEW master-sync transmission at the beginning of the HEW control period. During the HEW control period, the HEW stations may communicate with the master station in accordance with a non-contention-based multiple access technique. This is unlike conventional Wi-Fi communications in which devices communicate in accordance with a contention-based communication technique, rather than a multiple access technique. During the HEW control period, the master station may communicate with HEW stations using one or more HEW frames. Furthermore, during the HEW control period, legacy stations refrain from communicating. In some embodiments, the master-sync transmission may be referred to as an HEW control and schedule transmission.

In some embodiments, the multiple-access technique used during the HEW control period may be a scheduled orthogonal frequency division multiple access (OFDMA) technique, although this is not a requirement. In other embodiments, the multiple access technique may be a time-division multiple access (TDMA) technique or a frequency division multiple access (FDMA) technique. In certain embodiments, the multiple access technique may be a space-division multiple access (SDMA) technique.

The master station may also communicate with legacy stations in accordance with legacy IEEE 802.11 communication techniques. In some embodiments, the master station may also be configurable to communicate with HEW stations outside the HEW control period in accordance with legacy IEEE 802.11 communication techniques, although this is not a requirement.

In some embodiments, the links of an HEW frame may be configurable to have the same bandwidth. The bandwidth may be one of 20 MHz, 40 MHz, or 80 MHz contiguous bandwidths or an 80+80 MHz (160 MHz) non-contiguous bandwidth. In some embodiments, a 320 MHz contiguous bandwidth may be used. In some embodiments, bandwidths of 5 MHz and/or 10 MHz may also be used. In these embodiments, each link of an HEW frame may be configured for causing transmission of a number of spatial streams.

One or more illustrative wireless network stations (STAs) may be operable by one or more users 110. A station 120 may include any suitable processor-driven user device including, but not limited to, a desktop computing device, a laptop computing device, a server, a router, a switch, a smartphone, a tablet, wearable wireless device (e.g., a bracelet, a watch, glasses, a ring, etc.) and so forth.

Any of the stations 120 and the AP 102 may be configured to communicate with each other via one or more communications networks 130 wirelessly or wired. Any of the communications networks 130 may include, but are not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 may include any type of medium over which network traffic may be carried including, but not limited to, coaxial cable, twisted-pair wire, optical fiber, hybrid fiber coaxial (HFC) mediums, microwave terrestrial transceivers, radio frequency communication mediums, white space communication mediums, ultra-high frequency communication mediums, satellite communication mediums, or any combination thereof.

Any of the stations 120 and the AP 102 may include one or more communications antennas. A communications antenna may be any suitable type of antenna corresponding to the communications protocols used by the stations 120 and the AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the stations 120.

Any of the stations 120 and the AP 102 may include any suitable radio and/or transceiver for causing transmission of and/or receiving radio frequency (RF) signals in the bandwidth and/or channels corresponding to the communications protocols utilized by any of the stations 120 and the AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n), 5 GHz channels (e.g., 802.11n, 802.11ac), or 60 GHZ channels (e.g., 802.11ad). In some embodiments, non- Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and a digital baseband.

FIG. 2 is a chart that illustrates a further availability window (FAW) time schedule 200 in accordance with one or more example embodiments of the disclosure. In some embodiments, the FAW time schedule (also referred to as a FAW map) 200 may be announced by the first station, and may indicate that channel 6 is available for communication with the first station during the time slots (or intervals) 0-3 (e.g., as indicated by the bit values of "1" for the time slots 0-3), that channel 149 is available for communication with the first station during the time slots (or intervals) 8-11 (e.g., as indicated by the bit values of "1" for the time slots 8-11), that channel x is available for communication with the first station during the time slots (or intervals) 16-21 (e.g., as indicated by the bit values of "1" for the time slots 16-21), and that channel y is available for communication with the first station during the time slots (or intervals) 24-29 (e.g., as indicated by the bit values of "1" for the time slots 24-29). In some embodiments, a no availability window (NAW) time schedule (also referred to as an NAW map) may be similar to a FAW time schedule. An NAW time schedule, however, may indicate time slots (or intervals) that are not available for communication with a station 120. For example, if the first station is not available to communicate on channel 6 during the time slots (or intervals) 4 and 5, an NAW time schedule for the first station may explicitly indicate that channel 6 is not available for communication with the first station during the time slots (or intervals) 4 and 5. Thus, a station can use the NAW time schedule for the first station to determine a communication schedule that is consistent with the availability of the station, such that scheduled communications do not conflict with the unavailability of the station. For example, the second station may generate an adjusted communication schedule that does not include communication on channel 6 during the time slots (or intervals) 4 and 5.

Although certain embodiments are described with regard to one or more NAW time schedules, similar embodiments can be employed using one or more AAW time schedules. As described herein, an AAW may be announced or otherwise provided by a STA, and may indicate all time slots during which communication by the STA is available or otherwise not inhibited. Thus, an AAW time schedule for an STA may be an inverse of an NAW time schedule for the STA, indicating all the time slots that are available as opposed to all of the time slots that are not available. In some embodiments, an AAW time schedule for an STA can be provided in place of, or in conjunction with, a corresponding NAW time schedule for the STA described herein. Further, a recipient of an AAW time schedule for an STA can use the AAW time schedule to determine the time slots that are available and/or unavailable for the STA in a manner similar to that described with regard to the NAW time schedules. Continuing with the above example, if the first station is available to communicate on channel 6 during the time slots (or intervals) 0-3 (e.g., the $1^{st}$ through $4^{th}$ time slots) and (or intervals) 6-31 (e.g., the $7^{th}$ through $32^{nd}$ time slots), an AAW corresponding to the NAW for the first station (e.g., that is an inverse of the NAW for the first station) may explicitly indicate that channel 6 is available for communication with the first station channel 6 during time slots (or intervals) 0-3 and 6-31. Thus, a station can use the AAW time schedule for the first station to determine a communication schedule that is consistent with the availability of the station, such that scheduled communications do not conflict with the unavailability of the station. For example, the second station may generate an adjusted communication schedule that does not include communication on channel 6 during the time slots (or intervals) 4 and 5. Thus, the availability time schedules for one or more stations (e.g., the AAWs and/or NAWs for the one or more stations) can be used to negotiate a schedule for communicating between different stations.

In some embodiments, a further availability window (FAW) time schedule can be differentiated from a no availability window (NAW) time schedule by an entry control field, or other data associated with the time schedule. For example, if a control field that is transmitted with the data for a time schedule includes 8 bits (bits 0-7), the first two bits (bits 0 and 1) can be set to indicate the availability interval duration, the third bit (bit 2) can be set to indicate whether the associated time schedule is an FAW time schedule or an NAW time schedule, the fourth bit (bit 3) can be set to indicate whether the associated time schedule has been forwarded, and the other bits (bits 4-7) can be reserved or otherwise used or reserved for other purposes. The availability interval duration can indicate the availability interval duration associated with the availability intervals bitmap field. Using the first two bits (bits 0 and 1), the value can be set as follows: 0: 16 TU; 1: 32 TU; 2: 64 TU; 3: reserved. Using the third bit (bit 2), the indication of FAW or NAW can be set as follows: bit is set to 0 to indicate that the table is an FAW time schedule; and bit is set to 1 to indicate that the table is an NAW time schedule. Using the fourth bit (bit 3) the indication of forwarding can be set as follows: bit is set to 0 to indicate that the table has not been forwarded; and bit is set to 1 to indicate that the table has been forwarded. FIG. 3 is a table that illustrates an example entry control definition 300 in accordance with one or more example embodiments of the disclosure.

In some embodiments, during a scanning process, a station will listen for communication schedules that are announced by other stations in a neighborhood of stations during a discovery window (DW). If the station wants to communicate with another station, then the station may record the communication schedule(s) announced by the other station. For example, a first station may announce a first communication schedule and/or record a second communication schedule announced by the second station. In some embodiments, a station may be associated with an individual grade (IG), and the schedule may be associated with a schedule grade (SG). A communication schedule may include or otherwise be announced in conjunction with an IG that corresponds to the station that announced the communication schedule and/or an SG that is associated with the current grade communication schedule. The initial SG for a communication schedule may be the same as the IG of the station that generated the communication schedule.

In some embodiments, during a comparison process, a station may compare the SG of the schedule it is currently using (or has announced) to the SG of the communication schedules announced by other stations. For example, the first station may compare the SG of the schedule it is using (or has announced) to the SG of the second communication schedule announced by the second station. A station may give a right to generate an adjusted schedule to a station that announced a communication schedule with a higher SG than that of the station. For example, if the SG of the first schedule is smaller (or less than) the SG of the second schedule, then the first station may give the second station the right to generate an adjusted communication schedule. A station may give a right to generate an adjusted schedule to a station that announced a communication schedule with the highest SG. For example, if the SG of the first schedule is smaller (or less than) the SG of the second schedule, and a third station announces a communication schedule with an SG that is higher than the SG of the second schedule, then the first station may give the third station the right to generate an adjusted communication schedule.

If there are multiple communication schedules with the same SG, a station may give a right to generate an adjusted schedule to a station that announced a communication schedule with the SG and the highest IG. For example, if the SG of the first schedule is smaller (or less than) the SG of the second schedule, and a third station and a fourth station both announce third and fourth communication schedules with the same SG that is higher than the SG of the second communication schedule, and the fourth station has an IG that is higher than the IG for the third station (e.g., the IG for the fourth communication schedule is higher than the IG for the third communication schedule), then the first station may give the fourth station the right to generate an adjusted communication schedule.

If a station gives a right to another station to generate an adjusted communication schedule, then the station may compare its resource constraints with the communication schedule announced by that station. For example, if the first station gives the fourth station the right to generate an adjusted communication schedule based on the communication schedule announced by the fourth station (e.g., as discussed above), then the first station may compare its resource constraints with the fourth communication schedule announced by the fourth station.

If a station determines that a communication schedule announced by another station to which it has granted the right to generate an adjusted communication schedule does not violate or otherwise conflict with the resource constraints of the station, then the station may follow the communication schedule. For example, if the first station determines that the fourth communication schedule announced by the fourth station to which it has granted the right to generate an adjusted communication schedule does not violate or otherwise conflict with the resource constraints of the first station, then the first station may follow the fourth communication schedule.

If a station determines that a communication schedule announced by another station to which it has granted the right to generate an adjusted communication schedule does violate or otherwise conflict with the resource constraints of the station, then the station may send an NAW time schedule and/or an FAW time schedule. Continuing with the above example, if the first station determines that the fourth communication schedule announced by the fourth station (to which it has granted the right to generate an adjusted communication schedule) does violate or otherwise conflict with the resource constraints of the first station, then the first station may send an NAW time schedule and/or an FAW time schedule to the fourth station. The NAW time schedule may indicate time slots that are not available for communicating with the first station. The FAW time schedule may indicate available time slots for communicating with the first station.

A station that is responsible for adjusting communication schedules that will be followed by a group of stations may be referred to as an anchor schedule master. Initially, each station may set itself as the anchor schedule master of its schedule. If a station grants the right to generate an adjusted communication schedule to another station, then the station may set that other station as the anchor schedule master of its schedule. Continuing with the above example, the first station may initially set itself as the anchor schedule master for its communication schedule, but it may then set the fourth station as the anchor schedule master for its communication schedule.

If a station grants the right to generate an adjusted communication schedule to another station, then the station may set that other station as its immediate contact device (or station). Continuing with the above example, the first station may set the fourth station as its immediate contact device.

If a station receives an NAW time schedule and/or an FAW time schedule from another station, then the station may determine if it is the anchor schedule master of its schedule. If a station determines that it is the anchor schedule master of its schedule, then the station may generate a new (or adjusted) communication schedule based at least in part on the received NAW time schedule and/or an FAW time schedule, and may announce the new (or adjusted) communication schedule to the station that sent the NAW time schedule and/or the FAW time schedule and/or other stations. Continuing with the above example, if the fourth station receives an NAW time schedule and/or an FAW time schedule from the first station, and the fourth station is set as the anchor schedule master of its schedule, then the fourth station may generate a new (or adjusted) communication schedule based at least in part on the NAW time schedule and/or an FAW time schedule received from the first station, and may announce the new (or adjusted) communication schedule to the first station and/or other stations (e.g., the second and third stations).

If a station determines that it is not the anchor schedule master of its schedule, then the station forwards the NAW time schedule and/or the FAW time schedule. Continuing with the above example, if the fourth station receives an NAW time schedule and/or an FAW time schedule from the first station, and a fifth station is set as the immediate contact for the fourth station, then the fourth station may forward the NAW time schedule and/or the FAW time schedule (e.g., with the fourth bit of the entry control definition set to "1") to the fifth station. The NAW time schedule and/or the FAW time schedule may ultimately be received by a station that is the master of its schedule, and that station may generate a new (or adjusted) communication schedule based at least in part on the received NAW time schedule and/or an FAW time schedule, and may announce the new (or adjusted) communication schedule (e.g., announce the schedule to the fourth station).

In some embodiments, merging schedules for stations in a very large geographic area can also create problems. For example, a station in one area may have resource constraints different from the constraints for the stations in another area, and consideration of all resource constraints in different areas may overly limit available options. In some embodiments, a hop count can be employed to reduce the effects of resource constraints from a large number of stations. In some embodiments, each station can record a hop count to the anchor schedule master. In some embodiments, if a station has reached an agreement of schedules with another station, then the station can set its hop count equal to the hop count of the other station, plus one. In some embodiments, when a station forwards NAW/FAW, it can set the hop count equal to its hop count, plus one. In some embodiments, an anchor schedule master may only consider an update with a hop count less than some threshold hop count. In some embodiments, a station may only forward NAW/FAW, if the hop count is less than some threshold hop count. In some embodiments, the hop count for a schedule can be announced simultaneously with the schedule. In some embodiments, a station may only try to follow the schedule announced by one station if the hop count is less than some threshold hop count.

Figure 4:
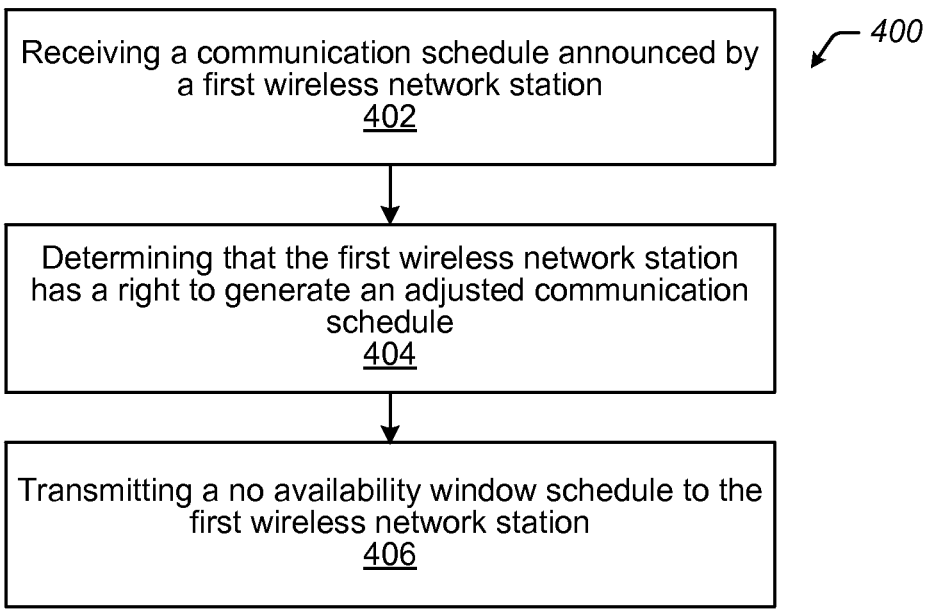
FIGS. 4 and 5 are flow diagrams that illustrate methods for scheduling communications in accordance with one or more example embodiments of the disclosure.

FIG. 4 is a flow diagram that illustrates an example method for scheduling communications 400 in accordance with one or more example embodiments of the disclosure. Method 400 may include receiving a communication schedule announced by a first wireless network station (block 402), determining that the first wireless network station has a right to generate an adjusted communication schedule (block 404), and causing transmission of a no availability window schedule to the first wireless network station (block 406).

In some embodiments, the communication schedule can specify one or more time slots available for communication between the first wireless network station and the wireless network stations. In some embodiments, the no availability window schedule may indicate one or more time slots during which communication with the wireless network station is inhibited. In some embodiments, the communication schedule announced by the first wireless network station may be associated with a schedule grade and an individual grade, and the individual grade for the communication schedule announced by the first wireless network station may correspond to a grade associated with the first wireless network station. In some embodiments, determining that the first wireless network station has a right to generate an adjusted communication schedule can include determining that the schedule grade associated with the communication schedule announced by the first wireless network station is equal to or higher than the schedule grade of a communication schedule of the wireless network station. In some embodiments, determining that the wireless network station of the one or more wireless network stations has a right to generate an adjusted communication schedule can include determining that the individual grade associated with the communication schedule announced by the first wireless network station is higher than the individual grade of a communication schedule announced by a second wireless network station.

In some embodiments, the method 400 can also include the following: receiving a first communication schedule from the first wireless network station; and determining that the first communication schedule conflicts with a resource constraint of the wireless network station, and the causing transmission of the no availability window schedule to the first wireless network station can performed in response to determining that the first communication schedule conflicts with a resource constraint of the wireless network station. In some embodiments, the method 400 can also include the following: receiving an adjusted communication schedule announced by the first wireless network station, and communicating with at least one of the one or more wireless network stations in accordance with the adjusted communication schedule. In some embodiments, the adjusted communication schedule specifies time slots available for communication that do not conflict with the one or more no availability window schedules.

Figure 5:
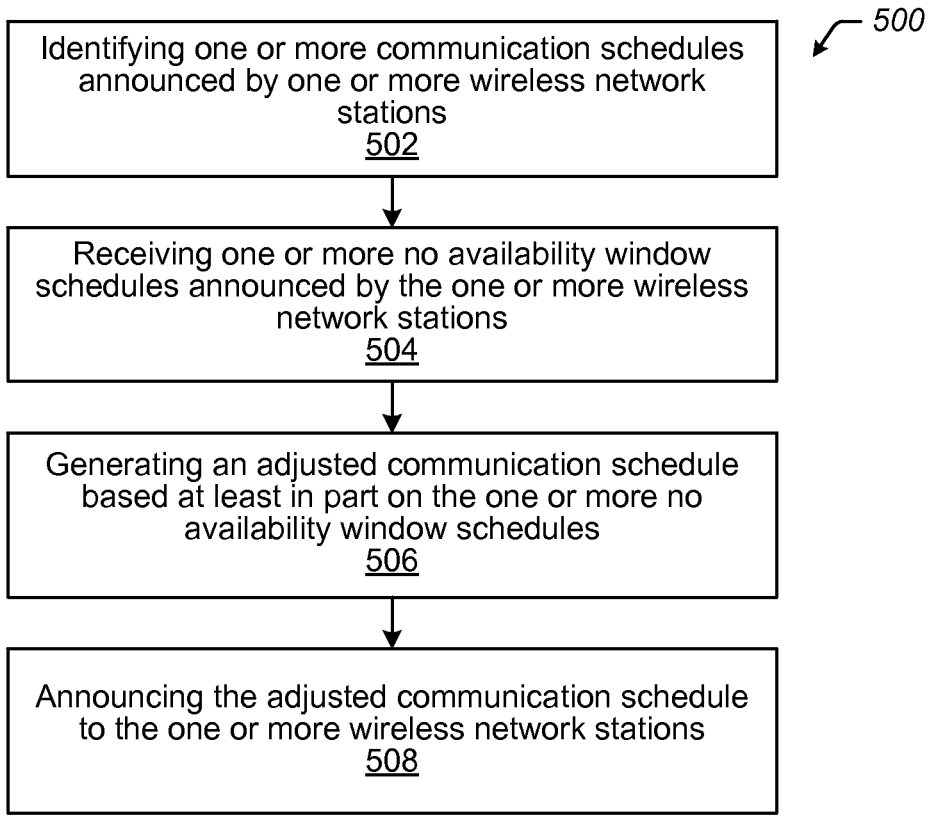

FIG. 5 is a flow diagram that illustrates an example method for scheduling communications 500 in accordance with one or more example embodiments of the disclosure. Method 500 may include identifying one or more communication schedules announced by one or more wireless network stations (block 502), receiving one or more no availability window schedules announced by the one or more wireless network stations (block 504), generating an adjusted communication schedule based at least in part on the one or more no availability window schedules (block 506), and announcing the adjusted communication schedule to the one or more wireless network stations (block 508).

In some embodiments, identifying the one or more communication schedules announced by the one or more wireless network stations can include scanning for the communication schedules announced by the one or more wireless network stations during a discovery window. In some embodiments, each of the one or more no availability window schedules can indicate a time period during which communication by at least one of the one or more wireless network stations is inhibited. In some embodiments, generating an adjusted communication schedule based at least in part on the one or more no availability window schedules can include generating the adjusted communication schedule to specify time slots available for communication that do not conflict with the one or more no availability window schedules. In some embodiments, the method 500 further includes communicating with at least one of the one or more wireless network stations in accordance with the adjusted communication schedule.

It will be appreciated that the methods 400 and 500 are exemplary embodiments of methods that may be employed in accordance with the techniques described herein. The methods 400 and 500 may be modified to facilitate variations of their implementations and uses. The order of the methods 400 and 500 and the operations provided therein may be changed, and various elements may be added, reordered, combined, omitted, modified, etc. The methods 400 and 500 may be implemented in software, hardware, or a combination thereof. Some or all of the methods 400 and 500 may be implemented by one or more of the devices/modules/applications described herein. For example, the method 400 and/or the method 500 may be employed by the station 120.

FIG. 6 is a functional diagram illustrating an example communication station 800 in accordance with one or more example embodiments of the disclosure. In one embodiment, FIG. 6 illustrates a functional block diagram of a communication station that may be suitable for use as an AP 102 (see FIG. 1) or a communication station 120 (see FIG. 1) in accordance with some embodiments. The communication station 800 may also be suitable for use as a handheld device, a mobile device, a cellular telephone, a smartphone, a tablet, a netbook, a wireless terminal, a laptop computer, a wearable computer device, a femtocell, a High Data Rate (HDR) subscriber station, an access point, an access terminal, or other personal communication system (PCS) device.

The communication station 800 may include physical layer circuitry 802 having a transceiver 810 for causing transmission of and receiving signals to and from other communication stations using one or more antennas 801. The physical layer circuitry 802 may also include medium access control (MAC) circuitry 804 for controlling access to the wireless medium. The communication station 800 may also include processing circuitry 806 and memory 808 arranged to perform the operations described herein. In some embodiments, the physical layer circuitry 802 and the processing circuitry 806 may be configured to perform the operations detailed herein.

In accordance with some embodiments, the MAC circuitry 804 may be arranged to contend for a wireless medium and configure frames or packets for communicating over the wireless medium, and the physical layer circuitry 802 may be arranged to transmit and receive signals. The physical layer circuitry 802 may include circuitry for modulation/demodulation, upconversion/downconversion, filtering, amplification, etc. In some embodiments, the processing circuitry 806 of the communication station 800 may include one or more processors. In other embodiments, two or more antennas 801 may be coupled to the physical layer circuitry 802 arranged for sending and receiving signals. The memory 808 may store information for configuring the processing circuitry 806 to perform the operations for configuring and causing transmission of message frames and to perform the various operations described herein. The memory 808 may include any type of memory, including non-transitory memory, for storing information in a form readable by a machine (e.g., a computer). For example, the memory 808 may include a computer-readable storage device, a read-only memory (ROM), a random-access memory (RAM), magnetic disk storage media, optical storage media, flash-memory devices, and other storage devices and media.

In some embodiments, the communication station 800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 800 may include one or more antennas 801. The antennas 801 may include one or more directional or omnidirectional antennas including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a causing transmission of station.

In some embodiments, the communication station 800 may include one or more of a keyboard, a display, a non-volatile memory port, multiple antennas, a graphics processor, an application processor, speakers, and other mobile device elements. The display may be an LCD screen including a touch screen.

Although the communication station 800 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 800 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 800 may include one or more processors and may be configured with instructions stored on a computer-readable storage device memory.

FIG. 7 is a block diagram that illustrates an example machine (or system) 900 in accordance with one or more example embodiments of the disclosure. Some or all of the techniques (e.g., methodologies) discussed herein may be performed on such a machine 900. In other embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in a peer-to-peer (P2P) (or other distributed) network environment. The machine 900 may be a personal computer (PC), a tablet PC, a set-top box (STB), a personal digital assistant (PDA), a mobile telephone, a wearable computer device, a web appliance, a network router, a switch or a bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer-readable medium containing instructions, where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a power management device 932, a graphics display device 910, an alphanumeric input device 912 (e.g., a keyboard), and a user interface (UI) navigation device 914 (e.g., a mouse). In an example, the graphics display device 910, the alphanumeric input device 912, and the UI navigation device 914 may be a touch screen display. The machine 900 may additionally include a storage device (e.g., a drive unit) 916, a signal generation device 918 (e.g., a speaker), a network interface device/transceiver 920 coupled to the antenna(s) 930, and one or more sensors 928, such as a global positioning system (GPS) sensor, a compass, an accelerometer, or other sensor. The machine 900 may include an output controller 934, such as a serial connection (e.g., a universal serial bus (USB), parallel, or other wired or wireless connection (e.g., infrared (IR) connection, near field communication (NFC) connection, and/or the like) to communicate with or control one or more peripheral devices (e.g., a printer, a card reader, and/or the like).

The storage device 916 may include a machine-readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 916 may constitute machine-readable media.

While the machine-readable medium 922 is illustrated as a single medium, the term "machine-readable medium" may include a single medium or multiple media (e.g., a centralized or distributed database, and/or associated caches and servers) configured to store the one or more instructions 924.

The term "machine-readable medium" may include any medium that is capable of storing, encoding, or carrying instructions for execution by the machine 900 and that cause the machine 900 to perform any one or more of the techniques of the present disclosure, or that is capable of storing, encoding, or carrying data structures used by or associated with such instructions. Non-limiting machine-readable medium examples may include solid-state memories, and optical and magnetic media. In an example, a massed machine-readable medium includes a machine-readable medium with a plurality of particles having resting mass. Specific examples of massed machine-readable media may include non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone Service (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to the communications network 926. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 900, and includes digital or analog communications signals or other intangible media to facilitate the communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Accordingly, provided in some embodiments is a wireless network station, comprising: one or more processors; and one or more memory devices storing program instructions that are executable by the one or more processors to cause: identifying a communication schedule announced by a first wireless network station, determining that the first wireless network station has a right to generate an adjusted communication schedule, and causing transmission of an availability window schedule to the first wireless network station, the availability window schedule indicating one or more time slots during which communication with the wireless network station is inhibited.

In some embodiments, the communication schedule specifies one or more time slots available for communication with the first wireless network station. In some embodiments, the availability window schedule comprises a no availability window time schedule that indicates one or more time slots during which communication with the wireless network station is inhibited or an all availability window time schedule that indicates one or more time slots during which communication with the wireless network station is allowed. In some embodiments, the communication schedule announced by the first wireless network station is associated with a schedule grade and an individual grade, and wherein the individual grade corresponds to a grade associated with the first wireless network station. In some embodiments, determining that the first wireless network station has a right to generate an adjusted communication schedule comprises: determining that the schedule grade associated with the communication schedule announced by the first wireless network station is equal to or higher than the schedule grade of a communication schedule of the wireless network station. In some embodiments, determining that the wireless network station of the one or more wireless network stations has a right to generate an adjusted communication schedule comprises: determining that the individual grade associated with the communication schedule announced by the first wireless network station is higher than the individual grade of a communication schedule announced by a second wireless network station. In some embodiments, the program instructions are further executable by the one or more processors to cause: identifying a first communication schedule from the first wireless network station, and determining that the first communication schedule conflicts with a resource constraint of the wireless network station, and the causing transmission of the availability window schedule to the first wireless network station is performed in response to determining that the first communication schedule conflicts with a resource constraint of the wireless network station. In some embodiments, the program instructions are further executable by the one or more processors to cause: identifying an adjusted communication schedule announced by the first wireless network station, and communicating with the first wireless network station in accordance with the adjusted communication schedule. In some embodiments, the adjusted communication schedule specifies time slots available for communication that do not conflict with the one or more availability window schedules.

Provided in some embodiments is a wireless network station, comprising: one or more processors, and one or more memory devices storing program instructions that are executable by the one or more processors to cause: identifying one or more communication schedules announced by one or more wireless network stations, identifying one or more availability window schedules announced by the one or more wireless network stations, each of the one or more availability window schedules for a wireless network station indicating one or more time slots during which communication with the wireless network station is inhibited, generating an adjusted communication schedule based at least in part on the one or more availability window schedules, and causing transmission of the adjusted communication schedule to the one or more wireless network stations.

In some embodiments, identifying the one or more communication schedules announced by the one or more wireless network stations comprises scanning for the communication schedules announced by the one or more wireless network stations during a discovery window. In some embodiments, each of the one or more availability window schedules for a wireless network station comprises a no availability window time schedule that indicates one or more time slots during which communication with the wireless network station is inhibited or an all availability window time schedule that indicates one or more time slots during which communication with the wireless network station is allowed. In some embodiments, generating an adjusted communication schedule based at least in part on the one or more availability window schedules comprises generating the adjusted communication schedule to specify time slots available for communication that do not conflict with the one or more availability window schedules. In some embodiments, the program instructions are further executable by the one or more processors to cause: communicating with at least one of the one or more wireless network stations in accordance with the adjusted communication schedule.

Provided in some embodiments is a non-transitory computer-readable storage medium comprising program instructions that are executable by one or more processors to cause: identifying, by a network station, a communication schedule announced by a first wireless network station, determining that the first wireless network station has a right to generate an adjusted communication schedule, and causing transmission of, by the network station, an availability window schedule to the first wireless network station, the availability window schedule indicating one or more time slots during which communication with a wireless network station is inhibited.

In some embodiments, the communication schedule may specify one or more time slots available for communication with the first wireless network station. In some embodiments, the availability window schedule comprises a no availability window time schedule that indicates one or more time slots during which communication with the wireless network station is inhibited or an all availability window time schedule that indicates one or more time slots during which communication with the wireless network station is allowed. In some embodiments, the communication schedule announced by the first wireless network station is associated with a schedule grade and an individual grade, and wherein the individual grade corresponds to a grade associated with the first wireless network station. In some embodiments, determining that the first wireless network station has a right to generate an adjusted communication schedule comprises: determining that the schedule grade associated with the communication schedule announced by the first wireless network station is equal to or higher than the schedule grade of a communication schedule of the wireless network station. In some embodiments, determining that the wireless network station of the one or more wireless network stations has a right to generate an adjusted communication schedule comprises: determining that the individual grade associated with the communication schedule announced by the first wireless network station is higher than the individual grade of a communication schedule announced by a second wireless network station. In some embodiments, the program instructions are further executable by the one or more processors to cause: identifying a first communication schedule from the first wireless network station, and determining that the first communication schedule conflicts with a resource constraint of the wireless network station, and the causing transmission of the availability window schedule to the first wireless network station is performed in response to determining that the first communication schedule conflicts with a resource constraint of the wireless network station. In some embodiments, the program instructions are further executable by the one or more processors to cause: identifying an adjusted communication schedule announced by the first wireless network station, and communicating with the first wireless network station in accordance with the adjusted communication schedule. In some embodiments, the adjusted communication schedule specifies time slots available for communication that do not conflict with the one or more availability window schedules.

Provided in some embodiments is a non-transitory computer-readable storage medium comprising program instructions that are executable by one or more processors to cause: identifying one or more communication schedules announced by one or more wireless network stations, identifying one or more availability window schedules announced by the one or more wireless network stations, each of the one or more availability window schedules for a wireless network station indicating one or more time slots during which communication with the wireless network station is inhibited, generating an adjusted communication schedule based at least in part on the one or more availability window schedules, and causing transmission of the adjusted communication schedule to the one or more wireless network stations.

In some embodiments, identifying the one or more communication schedules announced by the one or more wireless network stations comprises scanning for the communication schedules announced by the one or more wireless network stations during a discovery window. In some embodiments, each of the one or more availability window schedules for a wireless network station comprises a no availability window time schedule that indicates one or more time slots during which communication with the wireless network station is inhibited or an all availability window time schedule that indicates one or more time slots during which communication with the wireless network station is allowed. In some embodiments, generating an adjusted communication schedule based at least in part on the one or more availability window schedules comprises generating the adjusted communication schedule to specify time slots available for communication that do not conflict with the one or more availability window schedules. In some embodiments, the program instructions are further executable by the one or more processors to cause: communicating with at least one of the one or more wireless network stations in accordance with the adjusted communication schedule.

Provided in some embodiments is a method comprising: identifying, by a network station, a communication schedule announced by a first wireless network station, determining that the first wireless network station has a right to generate an adjusted communication schedule, and causing transmission of, by the network station, an availability window schedule to the first wireless network station, the availability window schedule indicating one or more time slots during which communication with a wireless network station is inhibited.

In some embodiments, the communication schedule may specify one or more time slots available for communication with the first wireless network station. In some embodiments, the availability window schedule comprises a no availability window time schedule that indicates one or more time slots during which communication with the wireless network station is inhibited or an all availability window time schedule that indicates one or more time slots during which communication with the wireless network station is allowed. In some embodiments, the communication schedule announced by the first wireless network station is associated with a schedule grade and an individual grade, and wherein the individual grade corresponds to a grade associated with the first wireless network station. In some embodiments, determining that the first wireless network station has a right to generate an adjusted communication schedule comprises: determining that the schedule grade associated with the communication schedule announced by the first wireless network station is equal to or higher than the schedule grade of a communication schedule of the wireless network station. In some embodiments, determining that the wireless network station of the one or more wireless network stations has a right to generate an adjusted communication schedule comprises: determining that the individual grade associated with the communication schedule announced by the first wireless network station is higher than the individual grade of a communication schedule announced by a second wireless network station. In some embodiments, the program instructions are further executable by the one or more processors to cause: identifying a first communication schedule from the first wireless network station, and determining that the first communication schedule conflicts with a resource constraint of the wireless network station, and the causing transmission of the availability window schedule to the first wireless network station is performed in response to determining that the first communication schedule conflicts with a resource constraint of the wireless network station. In some embodiments, the program instructions are further executable by the one or more processors to cause: identifying an adjusted communication schedule announced by the first wireless network station, and communicating with the first wireless network station in accordance with the adjusted communication schedule. In some embodiments, the adjusted communication schedule specifies time slots available for communication that do not conflict with the one or more availability window schedules.

Provided in some embodiments is a method comprising: identifying one or more communication schedules announced by one or more wireless network stations, identifying one or more availability window schedules announced by the one or more wireless network stations, each of the one or more availability window schedules for a wireless network station indicating one or more time slots during which communication with the wireless network station is inhibited, generating an adjusted communication schedule based at least in part on the one or more availability window schedules, and causing transmission of the adjusted communication schedule to the one or more wireless network stations.

In some embodiments, identifying the one or more communication schedules announced by the one or more wireless network stations comprises scanning for the communication schedules announced by the one or more wireless network stations during a discovery window. In some embodiments, each of the one or more availability window schedules for a wireless network station comprises a no availability window time schedule that indicates one or more time slots during which communication with the wireless network station is inhibited or an all availability window time schedule that indicates one or more time slots during which communication with the wireless network station is allowed. In some embodiments, generating an adjusted communication schedule based at least in part on the one or more availability window schedules comprises generating the adjusted communication schedule to specify time slots available for communication that do not conflict with the one or more availability window schedules. In some embodiments, the program instructions are further executable by the one or more processors to cause: communicating with at least one of the one or more wireless network stations in accordance with the adjusted communication schedule.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation. As used throughout this application, the singular forms "a," "an," and "the" include plural referents unless the content clearly indicates otherwise. Thus, for example, reference to "an element" may include a combination of two or more elements. As used throughout this application, the phrase "based on" does not limit the associated operation to being solely based on a particular item. Thus, for example, processing "based on" data A may include processing based at least in part on data A and based at least in part on data B unless the content clearly indicates otherwise. Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A wireless network station, comprising:
one or more processors; and
one or more memory devices storing program instructions that are executable by the one or more processors to cause:
identifying a communication schedule announced by a first wireless network station;
determining that the first wireless network station has a right to generate an adjusted communication schedule; and
causing transmission of an availability window schedule to the first wireless network station, based at least in part on the determination that the first wireless network station has the right to generate the adjusted communication schedule, and wherein the availability window schedule indicates one or more time slots during which communication with the wireless network station is inhibited.

2. The wireless network station of claim 1, wherein the communication schedule specifies one or more time slots available for communication with the first wireless network station.

3. The wireless network station of claim 1, wherein the availability window schedule comprises a no availability window time schedule that indicates one or more time slots during which communication with the wireless network station is inhibited or an all availability window time schedule that indicates one or more time slots during which communication with the wireless network station is allowed.

4. The wireless network station of claim 1, wherein the communication schedule announced by the first wireless network station is associated with a schedule grade and an individual grade, and wherein the individual grade corresponds to a grade associated with the first wireless network station.

5. The wireless network station of claim 4, wherein determining that the first wireless network station has a right to generate an adjusted communication schedule comprises:
determining that the schedule grade associated with the communication schedule announced by the first wireless network station is equal to or higher than the schedule grade of a communication schedule of the wireless network station.

6. The wireless network station of claim 5, wherein determining that the wireless network station of the one or more wireless network stations has a right to generate an adjusted communication schedule comprises:

determining that the individual grade associated with the communication schedule announced by the first wireless network station is higher than the individual grade of a communication schedule announced by a second wireless network station.

7. The wireless network station of claim 1, wherein the program instructions are further executable by the one or more processors to cause:
   identifying a first communication schedule from the first wireless network station; and
   determining that the first communication schedule conflicts with a resource constraint of the wireless network station, and
   wherein causing the transmission of the availability window schedule to the first wireless network station is performed in response to determining that the first communication schedule conflicts with a resource constraint of the wireless network station.

8. The wireless network station of claim 1, wherein the program instructions are further executable by the one or more processors to cause:
   identifying an adjusted communication schedule announced by the first wireless network station; and
   communicating with the first wireless network station in accordance with the adjusted communication schedule.

9. The wireless network station of claim 8, wherein the adjusted communication schedule specifies time slots available for communication that do not conflict with the one or more availability window schedules.

10. A wireless network station, comprising:
    one or more processors; and
    one or more memory devices storing program instructions that are executable by the one or more processors to cause:
        identifying one or more communication schedules announced by one or more wireless network stations;
        identifying one or more availability window schedules announced by the one or more wireless network stations, each of the one or more availability window schedules for a wireless network station indicating one or more time slots during which communication with the wireless network station is inhibited;
        generating an adjusted communication schedule based at least in part on the one or more availability window schedules; and
        causing transmission of the adjusted communication schedule to the one or more wireless network stations.

11. The wireless network station of claim 10, wherein identifying the one or more communication schedules announced by the one or more wireless network stations comprises scanning for the communication schedules announced by the one or more wireless network stations during a discovery window.

12. The wireless network station of claim 10, wherein each of the one or more availability window schedules for a wireless network station comprises a no availability window time schedule that indicates one or more time slots during which communication with the wireless network station is inhibited or an all availability window time schedule that indicates one or more time slots during which communication with the wireless network station is allowed.

13. The wireless network station of claim 10, wherein generating an adjusted communication schedule based at least in part on the one or more availability window schedules comprises generating the adjusted communication schedule to specify time slots available for communication that do not conflict with the one or more availability window schedules.

14. The wireless network station of claim 10, wherein the program instructions are further executable by the one or more processors to cause:
    communicating with at least one of the one or more wireless network stations in accordance with the adjusted communication schedule.

15. A non-transitory computer-readable storage medium comprising program instructions that are executable by one or more processors to cause:
    identifying, by a network station, a communication schedule announced by a first wireless network station;
    determining that the first wireless network station has a right to generate an adjusted communication schedule; and
    causing transmission of, by the network station, and based at least in part on the determination that the first wireless network station has the right to generate the adjusted communication schedule, an availability window schedule to the first wireless network station, wherein the availability window schedule indicates one or more time slots during which communication with the wireless network station is inhibited.

16. The medium of claim 15, wherein the communication schedule specifies one or more time slots available for communication with the first wireless network station.

17. The medium of claim 15, wherein the availability window schedule comprises a no availability window time schedule that indicates one or more time slots during which communication with the wireless network station is inhibited or an all availability window time schedule that indicates one or more time slots during which communication with the wireless network station is allowed.

18. The medium of claim 15, wherein the communication schedule announced by the first wireless network station is associated with a schedule grade and an individual grade, and wherein the individual grade corresponds to a grade associated with the first wireless network station.

19. The medium of claim 18, wherein determining that the first wireless network station has a right to generate an adjusted communication schedule comprises:
    determining that the schedule grade associated with the communication schedule announced by the first wireless network station is equal to or higher than the schedule grade of a communication schedule of the wireless network station.

20. The medium of claim 19, wherein determining that the wireless network station of the one or more wireless network stations has a right to generate an adjusted communication schedule comprises:
    determining that the individual grade associated with the communication schedule announced by the first wireless network station is higher than the individual grade of a communication schedule announced by a second wireless network station.

21. The medium of claim 15, wherein the program instructions are further executable by the one or more processors to cause:
    identifying a first communication schedule from the first wireless network station; and
    determining that the first communication schedule conflicts with a resource constraint of the wireless network station, and
    wherein causing the transmission of the no availability window schedule to the first wireless network station is performed in response to determining that the first communication schedule conflicts with a resource constraint of the wireless network station.

22. The medium of claim 15, wherein the program instructions are further executable by the one or more processors to cause:
identifying an adjusted communication schedule announced by the first wireless network station; and
communicating with the first wireless network station in accordance with the adjusted communication schedule.

23. The medium of claim 22, wherein the adjusted communication schedule specifies time slots available for communication that do not conflict with the one or more availability window schedules.

24. A method comprising:
identifying, by a network station, a communication schedule announced by a first wireless network station;
determining that the first wireless network station has a right to generate an adjusted communication schedule; and
causing transmission of, by the network station and based at least in part on the determination that the first wireless network station has the right to generate the adjusted communication schedule, an availability window schedule to the first wireless network station, wherein the availability window schedule indicates one or more time slots during which communication with the wireless network station is inhibited.

25. The method of claim 24, wherein the communication schedule specifies one or more time slots available for communication with the first wireless network station.

* * * * *